(12) United States Patent
Stoyanov et al.

(10) Patent No.: US 12,291,970 B2
(45) Date of Patent: *May 6, 2025

(54) CARBON SEAL ASSEMBLY

(71) Applicant: RTX Corporation, Farmington, CT (US)

(72) Inventors: Pantcho P. Stoyanov, West Hartford, CT (US); Jonathan F. Zimmitti, Glastonbury, CT (US); Nasr A. Shuaib, Watertown, MA (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,462

(22) Filed: Jun. 15, 2023

(65) Prior Publication Data
US 2023/0323782 A1 Oct. 12, 2023

Related U.S. Application Data

(62) Division of application No. 16/791,324, filed on Feb. 14, 2020, now Pat. No. 11,692,449.

(51) Int. Cl.
| | | |
|---|---|---|
| *F16J 15/16* | (2006.01) | |
| *F01D 11/00* | (2006.01) | |
| *F01D 25/00* | (2006.01) | |
| *F01D 25/18* | (2006.01) | |
| *F16J 15/30* | (2006.01) | |

(52) U.S. Cl.
CPC .......... *F01D 11/003* (2013.01); *F01D 25/005* (2013.01); *F01D 25/186* (2013.01); *F16J 15/162* (2013.01); *F16J 15/30* (2013.01); *F05D 2240/55* (2013.01); *F05D 2300/224* (2013.01); *F05D 2300/611* (2013.01)

(58) Field of Classification Search
CPC .... F01D 11/003; F01D 25/005; F01D 25/186; F16J 15/162; F16J 15/30; F16J 15/34; F16J 15/3496; F05D 2240/55; F05D 2300/224; F05D 2300/611
See application file for complete search history.

(56) References Cited

U.S. PATENT DOCUMENTS

| | | |
|---|---|---|
| 5,544,896 A | 8/1996 | Draskovich et al. |
| 6,655,695 B1 | 12/2003 | Sund et al. |
| 7,234,541 B2 | 6/2007 | Scott et al. |
| 8,530,050 B2 | 9/2013 | Ross et al. |
| 9,896,934 B2 | 2/2018 | Villeneuve et al. |

(Continued)

FOREIGN PATENT DOCUMENTS

| | | |
|---|---|---|
| DE | 102006028154 B4 | 6/2008 |
| DE | 102021102934 A1 | 8/2022 |

(Continued)

OTHER PUBLICATIONS

Partial European Search Report for European Application No. 21156828.2 mailed May 4, 2021.

*Primary Examiner* — Gilbert Y Lee
(74) *Attorney, Agent, or Firm* — Carlson, Gaskey & Olds, P.C.

(57) ABSTRACT

A seal assembly includes a carbon seal that has a sealing surface. A seal seat has a sealing surface and is positioned for rotation relative to the carbon seal. A diamond-like carbon coating at least partially forms the sealing surface on the seal seat.

3 Claims, 4 Drawing Sheets

(56) References Cited

U.S. PATENT DOCUMENTS

| | | |
|---|---|---|
| 10,233,934 B2 | 3/2019 | Marya et al. |
| 10,280,977 B2 | 5/2019 | Itadani et al. |
| 10,519,791 B2 | 12/2019 | Yoshida et al. |
| 2004/0031625 A1* | 2/2004 | Lin ................... F16C 33/043 |
| | | 175/371 |
| 2010/0061676 A1 | 3/2010 | Sugiyama et al. |
| 2014/0117627 A1 | 5/2014 | Franke |
| 2015/0345642 A1 | 12/2015 | Haas et al. |
| 2018/0112711 A1 | 4/2018 | Itadani et al. |
| 2018/0311939 A1 | 11/2018 | Larrieu et al. |
| 2019/0157938 A1 | 5/2019 | Legros |

FOREIGN PATENT DOCUMENTS

| | | |
|---|---|---|
| EP | 3527859 A1 | 8/2019 |
| EP | 3626694 A1 | 3/2020 |
| WO | 2010020394 | 2/2010 |

\* cited by examiner

CARBON SEAL ASSEMBLY

CROSS-REFERENCE TO RELATED APPLICATIONS

This application is a divisional of U.S. patent application Ser. No. 16/791,324 filed on Feb. 14, 2020.

BACKGROUND

The present disclosure relates to seals and, more particularly, to carbon seals used in gas turbine engines.

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section.

In one example, circumferential carbon seals are used in bearing compartments of gas turbine engines to provide a seal between oil used to lubricate parts of the gas turbine engine and other parts of the gas turbine engine. Bearing assemblies may also support a rotating shaft of the gas turbine engine. The circumferential carbon seals may be sealed against a seal carrier or housing against rotating seal components of the gas turbine engine.

SUMMARY

In one exemplary embodiment, a seal assembly includes a carbon seal that has a sealing surface. A seal seat has a sealing surface and is positioned for rotation relative to the carbon seal. A diamond-like carbon coating at least partially forms the sealing surface on the seal seat.

In a further embodiment of any of the above, the seal seat is comprised of at least one of a ceramic matric composite, a silicon nitride, or a silicon carbide.

In a further embodiment of any of the above, the diamond-like carbon coating is in direct contact with the seal seat.

In a further embodiment of any of the above, the diamond-like carbon coating includes a sp2 content that is greater than a sp3 content. The seal seat is comprised of at least one of a ceramic matrix composite, a silicon nitride, or a silicon carbide.

In a further embodiment of any of the above, the diamond-like carbon coating extends circumferentially around the seal seat.

In another exemplary embodiment, a seal assembly includes a carbon seal that has a sealing surface. A seal seat has a sealing surface and is positioned for rotation relative to the carbon seal. The seal seat includes a recess and an insert located in the recess. A diamond-like carbon coating at least partially forms the sealing surface on the insert.

In a further embodiment of any of the above, the diamond-like carbon coating is located inward from a perimeter of the insert.

In a further embodiment of any of the above, the diamond-like carbon coating is spaced from the seal seat.

In a further embodiment of any of the above, the insert is comprised of at least one of a ceramic matrix composite, a silicon nitride, or a silicon carbide.

In a further embodiment of any of the above, the recess is located in an axially facing surface of the seal seat.

In another exemplary embodiment, a seal assembly includes a carbon seal that has a sealing surface. A shaft has a sealing surface and is positioned for rotation relative to the carbon seal. The shaft includes a recess and an insert located in the recess. A diamond-like carbon coating at least partially forms the sealing surface on the insert.

In a further embodiment of any of the above, the diamond-like carbon coating is located inward from a perimeter of the insert.

In a further embodiment of any of the above, the diamond-like carbon coating is spaced from the shaft.

In a further embodiment of any of the above, the insert is comprised of at least one of a ceramic matrix composite, a silicon nitride, or a silicon carbide.

In a further embodiment of any of the above, the recess is located in a radially outer surface of the shaft.

In another exemplary embodiment, a seal assembly includes a static structure including a recess and an insert located in the recess. A carbon seal that includes a sealing surface and an attachment surface is located adjacent the insert. A diamond-like carbon coating at least partially forms the sealing surface on the insert and in contact with the carbon seal.

In a further embodiment of any of the above, the diamond-like carbon coating is located inward from a perimeter of the insert.

In a further embodiment of any of the above, the diamond-like carbon coating is spaced from the static structure.

In a further embodiment of any of the above, the insert is comprised of at least one of a ceramic matrix composite, a silicon nitride, or a silicon carbide.

In another exemplary embodiment, a method of using a seal assembly includes locating a carbon seal adjacent a recess in a structure. The carbon seal is separated from the structure with a diamond-like carbon coating. A lubricant is generated between the carbon seal and the diamond-like carbon coating.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
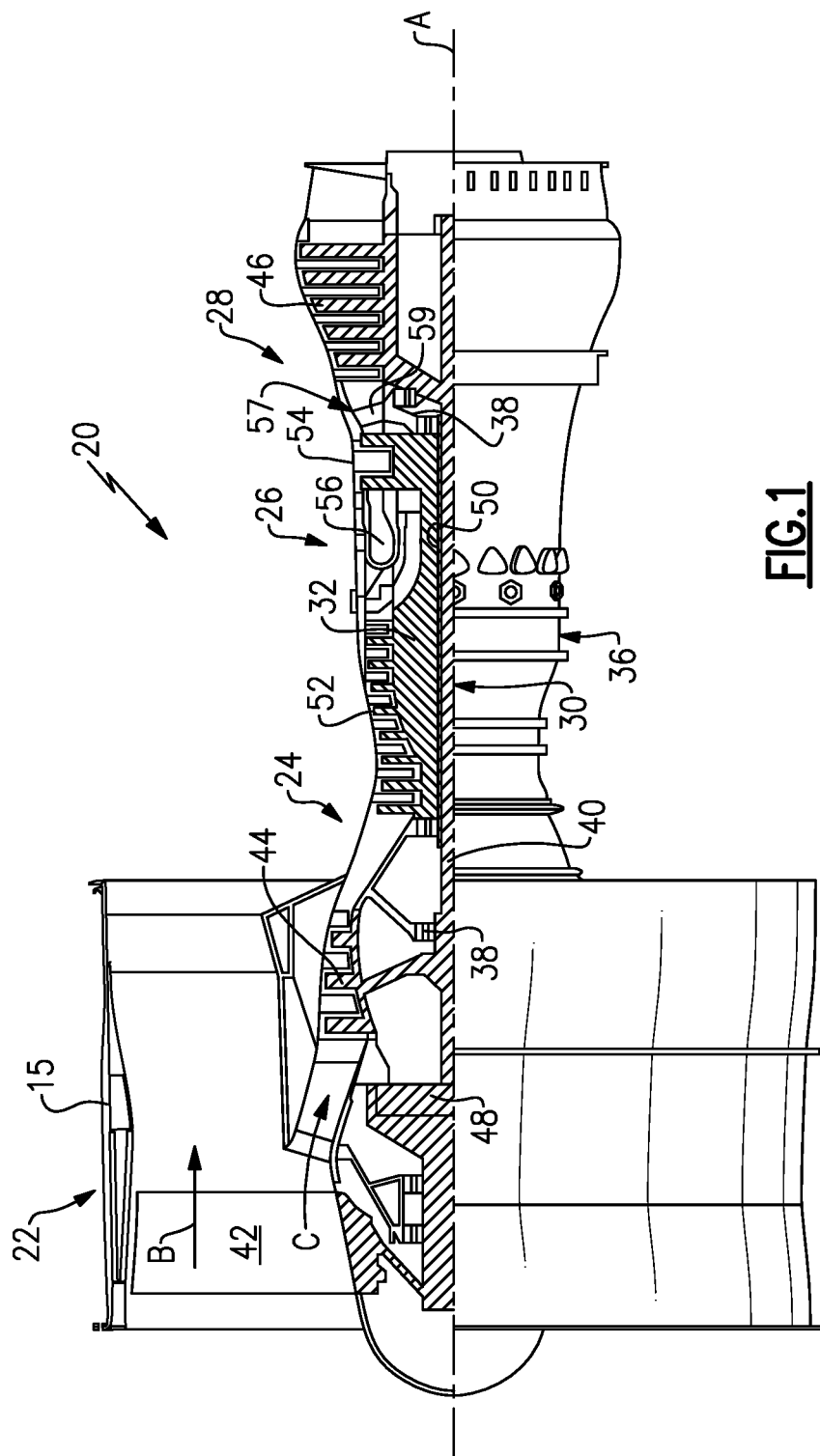
FIG. 1 is a schematic view of a non-limiting example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
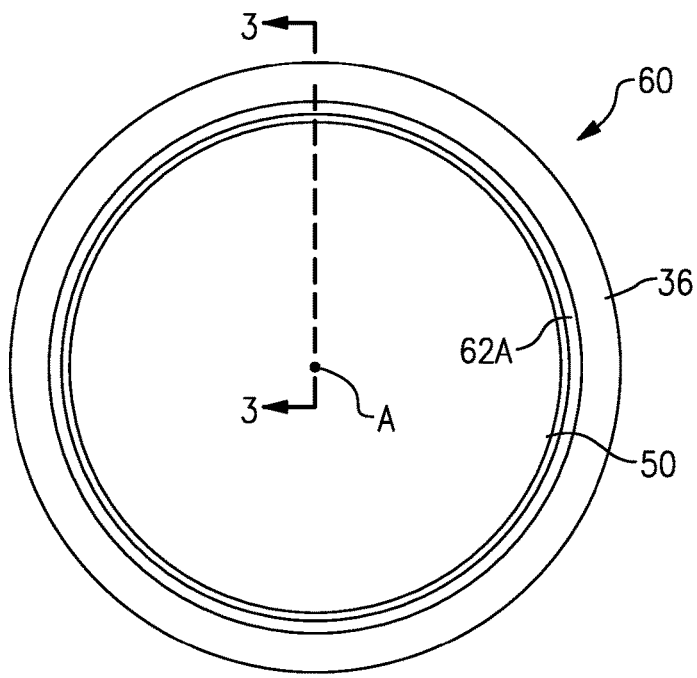
FIG. 2 illustrates an axial view of a shaft and a carbon seal assembly.
Figure 3:
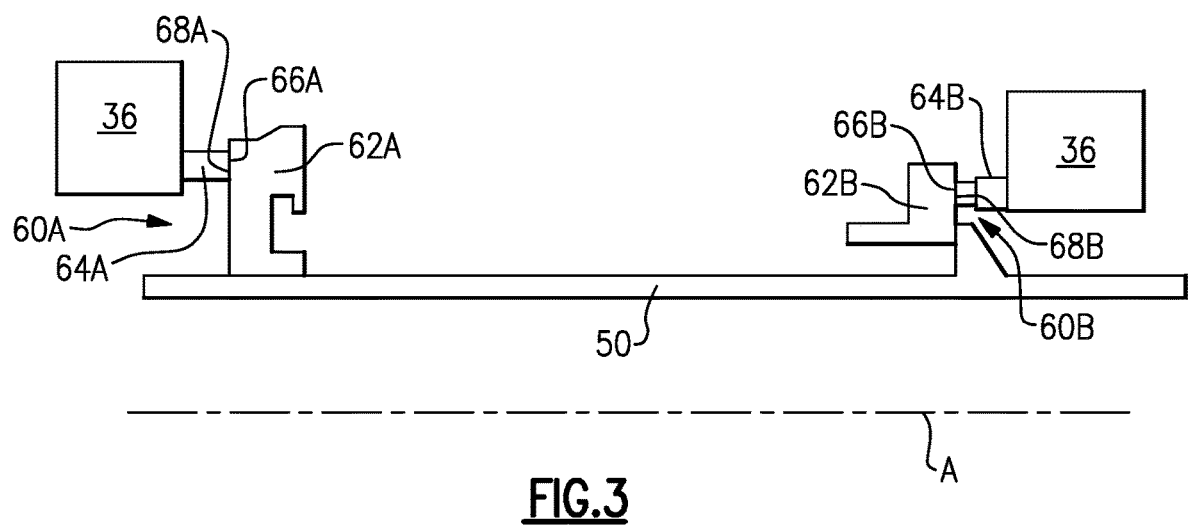
FIG. 3 illustrates a cross-sectional view taken along line 3-3 of FIG. 2.

FIGS. 2 and 3 schematically illustrate a pair of carbon seal assemblies 60A, 60B that each completely surround a shaft, such as the outer shaft 50. However, the carbon seal assemblies 60A, 60B could be located around other shafts in the gas turbine engine 20, such as the inner shaft 40 or shafts within the geared architecture 48.

As shown in FIG. 3, the pair of carbon seal assemblies 60A, 60B include a forward carbon seal assembly 60A and an aft carbon seal assembly 60B. In this disclosure, radial or radially and axial or axially is in relation to the central longitudinal axis A and upstream or downstream and forward or aft is in relation to a flow of air through the gas turbine engine 20. The forward and aft carbon seal assemblies 60A, 60B each serve to prevent leakage or flow of oil past the respective carbon seal assemblies 60A, 60B, and thereby maintain oil where desired and needed in the gas turbine engine 20. For example, the forward and aft car seal assemblies 60A, 60B maintain oil in a bearing compartment defined between the forward and aft carbon sealing assemblies 60A, 60B.

The forward carbon seal assembly 60A is defined by a forward seal seat 62A and a forward carbon seal 64A. The forward carbon seal 64A remains stationary relative to the engine static structure 36. The forward seal seat 62A is fixed relative to the outer shaft 50. The forward carbon seal 64A includes a sealing surface 66A that slides relative to a sealing surface 68A on the forward seal seat 62A to create the seal and prevent leakage of oil past the sealing surfaces 66A, 68A.

Similarly, the aft carbon seal assembly 60B is defined by an aft seal seat 62B and an aft carbon seal 64B. The aft carbon seal 64B remains stationary relative to the engine static structure 36. The aft seal seat 62B is fixed relative to the outer shaft 50. The aft carbon seal 64B includes a sealing surface 66B that slides relative to a sealing surface 68B on the aft seal seat 62B to create the seal and prevent leakage of oil past these sealing surfaces 66B, 68B. The forward and aft carbon seals 64A, 64B can be comprised of a suitable electrocarbon, such as an electrographitic grade carbon, salt impregnated carbon-graphite, resin impregnated carbon-graphite, non-impregnated carbon graphite, salt impregnated electrographite, non-impregnated electrographite, either in the entirety or partially. Additionally, the forward and aft seal seats 62A, 62B can be comprised of a metallic material either entirely or partially.

Figure 4:
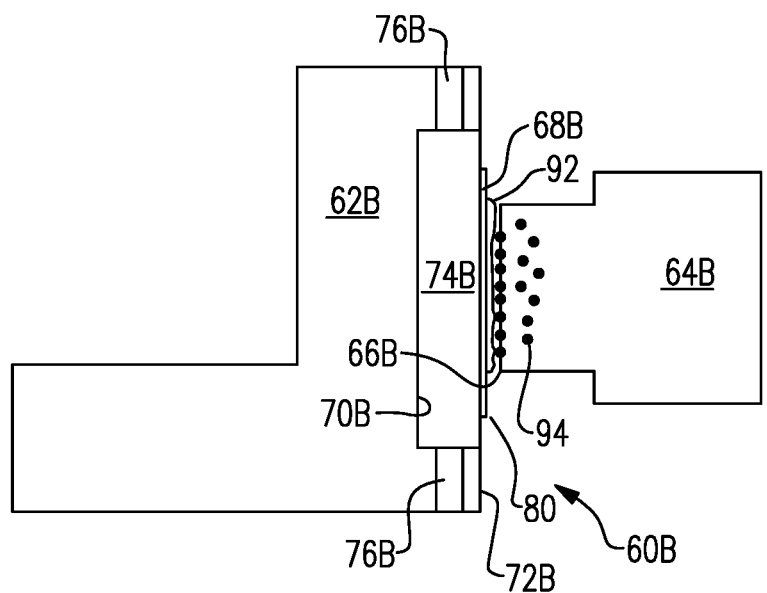
FIG. 4 is an enlarged view of an example aft carbon seal assembly.

FIG. 4 illustrates an enlarged view of the aft carbon seal assembly 60B. However, the below discussion of the aft carbon seal assembly 60B also applies to the forward carbon seal assembly 60A. The aft seal seat 62B includes the sealing surface 68B facing the sealing surface 66B on the aft carbon seal 64B. The aft seal seat 62B includes a recess 70B in an aft surface 72B that forms a complete circumferential recess around the aft seal seat 62B. An insert 74B is located in the recess 70B. The insert 74B is sized to friction fit or press fit into the recess 70B. The insert 74B can also be secured secondarily or primarily by one or more fasteners 76B, such as a screw or a recessed set screw, extending through the aft seal seat 62B. The insert 74B comprises at least one of a ceramic matrix composite ("CMC"), a silicon nitride, or a silicon carbide.

The sealing surface 68B on the aft surface 72B includes a diamond-like carbon ("DLC") coating 80 applied to the insert 74B and the DLC coating 80 is at least partially spaced from the aft seal seat 62B by the insert 74B. Therefore, the aft carbon seal 64B is spaced from and not in contact with the aft seal seat 62B due at least in part to the inset 74B and the DLC coating 80. The DLC coating 80 extends circumferentially with the insert 74B to form a complete ring of separation between the aft seal seat 62B and the aft carbon seal 64B.

The DLC coating 80 is applied through one of a PVD or a CVD process. In the illustrated example, the thicknesses of the insert 74B and the DLC coating 80 are for illustrative purposes only and are not to scale. For example, the DLC coating 80 is approximately 1 micrometer (0.04 thousandths of an inch).

The DLC coating 80 is a thin film formed from a DLC material having sp2 and sp3 content. The sp2 content is indicative of graphitic content of the material, while the sp3 content is indicative of the diamond-like content of the material. In one non-limiting configuration, the sp2 content of the film material is greater than the sp3 content. Another aspect for characterizing the DLC material is referred to as micro-Raman. Micro-Raman provides a 'G' peak and a 'D' peak, which refer to disorder and graphite respectively. The DLC coating 80 film for use in the present disclosure can have a I(D)/I(G) peak ratio of < or =1.0 based on micro-Raman analysis.

In another non-limiting configuration, the DLC coating 80 can be doped with carbide-forming metals to improve wear resistance of the film. Such carbide-forming metals can include tungsten or silicon or combinations thereof, and these metals help to form carbides in the film which increase wear resistance. In some instances, the carbide-forming metal can also or in addition be chromium or molybdenum or combinations thereof, which can also assist in the formation of carbides.

It should be appreciated that the DLC coating 80 in accordance with the present disclosure produces a low friction and wear-resistant carbon-based seal interface which, for example, can operate effectively between 200 and 350° F., under elevated sliding velocities. This, in turn, can reduce sub-surface heating (for example due to frictional heating) by reducing the friction co-efficient and improving the break-in phase, which will consequently improve long term wear resistance of the aft carbon seal 64. In the illustrated example, the siding velocities produced by rotating the outer shaft 50 can include a velocity relative to the aft carbon seal 64B of at least 152 m/s (approximately 500 ft/s) or at least 183 m/s (approximately 600 ft/s).

The DLC coating 80 creates a carbon-carbon interface with low friction from the beginning of operation, and therefore produces a very short break-in phase. For example, the sealing surface 66B on the carbo seal 64B and the sealing surface 68B on the seal seat 62B have a coefficient of friction of less than 0.1. During initial operation, a transfer film or graphitic material 92 is formed over the DLC coating 80. The graphitic material 92 remains through steady state operation of the aft carbon seal 64B to reduce wear on the aft carbon seal 64B. In the illustrated example, the aft carbon seal 64B also includes film controllers 94. The film controllers 94 serve to prevent excessive buildup of thickness of the graphitic material 92, thereby maintaining the desired carbon-carbon sliding surfaces defined by the aft carbon seal 64B on one side and the graphitic material 92 on the other.

Figure 5:
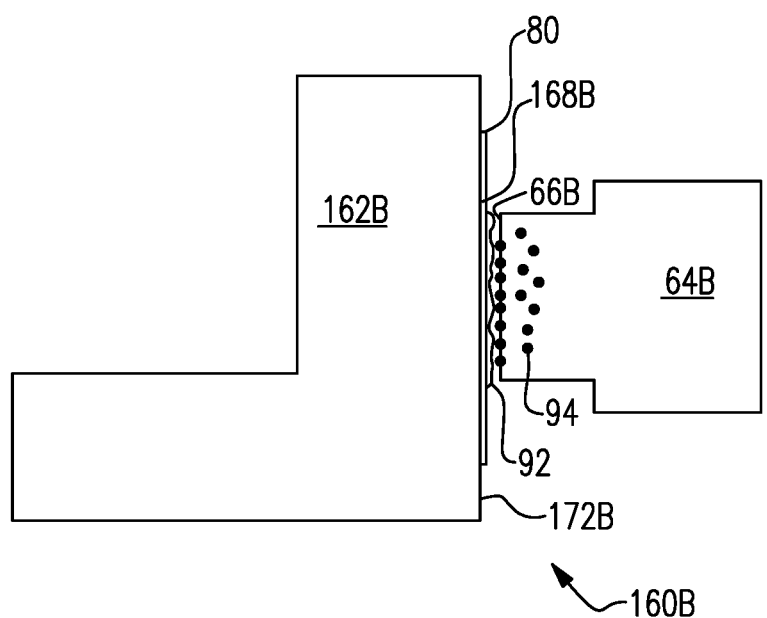
FIG. 5 is an enlarged view of another example aft carbon seal assembly.

FIG. 5 illustrates another example aft carbon seal assembly 160B similar to the aft carbon seal assembly 60B except where described below or shown in the Figures. Similar components between the aft carbon seal assemblies 160B and 60B will include the addition of a leading 1. Additionally, the disclosure regarding the aft carbon seal assembly 160B would also apply to another carbon seal assembly, such as the forward carbon seal assembly. The aft carbon seal assembly 160B includes an aft seal seat 162B having a sealing surface 168B without an insert like the aft carbon seal assembly 60B. However, the aft seal seat 162B is comprised of the same material as the insert 74B, such as at least one of a ceramic matrix composite ("CMC"), a silicon nitride, or a silicon carbide. The DLC coating 80 can then be applied directly to the aft seal seat 162B as described above without the need of an additional insert that separates the DLC coating 80 from the aft seal seat 162B.

Figure 6:
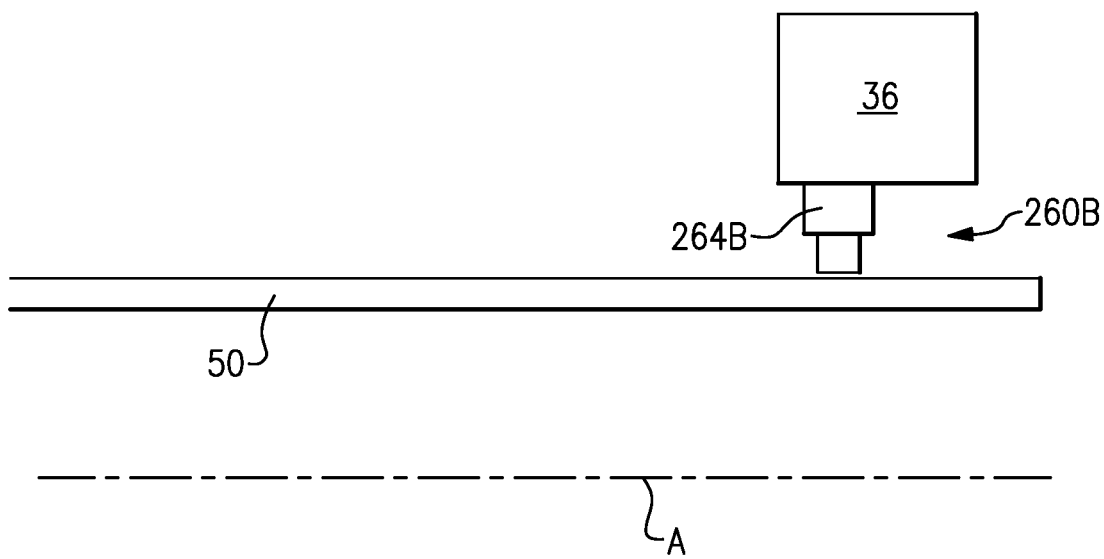
FIG. 6 illustrates a cross-sectional view of another example carbon seal assembly.
Figure 7:
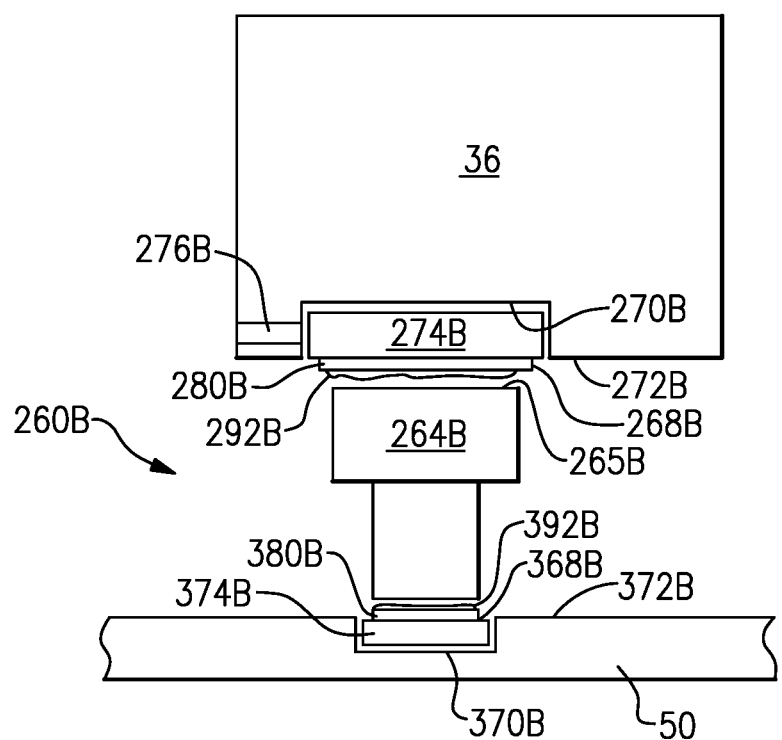
FIG. 7 is an enlarged view of the carbon seal assembly of FIG. 6.

FIGS. 6 and 7 illustrate yet another aft carbon seal assembly 260B. The aft carbon seal assembly 260B is similar to the aft carbon seal assemblies 60B, 160B except where described below or shown in the Figures. Similar components between the aft carbon seal assemblies 260B and 60B will include the addition of a leading 2 or 3. With the aft carbon seal assembly 260B, an aft carbon seal 264B is positioned between the engine static structure 36 and the outer shaft 50 without the use of a separate seal seat as shown in FIGS. 3-5. Alternatively, the engine static structure 36 could include a seal housing for supporting the aft carbon seal 264B.

A radially outer side of the aft carbon seal 264B forms an attachment surface 265B and remains mostly stationary relative to the engine static structure 36. The static structure 36 includes a recess 270B in a radially inner surface 272B that forms a complete circumferential recess around the engine static structure 36. An insert 274B is located in the recess 270B. The insert 274B is sized to friction fit or press fit into the recess 270B. The insert 274B can also be secured secondarily or primarily by one or more fasteners 276B, such as a screw or a recessed set screw, extending through the engine static structure 36. The insert 274B comprises at least one of a ceramic matrix composite ("CMC"), a silicon nitride, or a silicon carbide.

A seal contact surface 268B is located adjacent the radially inner surface 272B and includes a DLC coating 280B applied to the insert 274B. The DLC coating 280B is at least partially spaced from the engine static structure 36 by the insert 274B. Therefore, the aft carbon seal 264B is spaced from and not in contact with the engine static structure 36 due at least in part to the inset 274B and the DLC coating 280. The DLC coating 280B extends circumferentially with the insert 274B to form a complete ring of separation between the engine static structure 36 and the aft carbon seal 264B. During initial operation, a transfer film or graphitic material 292B is formed over the DLC coating 280B. The graphitic material 292B creates a carbon on carbon interface with the aft carbon seal 264B to reduce wear on the aft carbon seal 264B that can result from small movements between the aft carbon seal 264B and the engine static structure 36. Furthermore, the recess 270B and insert 274B could be used with the static structure 36 in connection with the aft carbon seal 64B shown in FIGS. 3-5.

Additionally, a radially inner side or sealing surface of the aft carbon seal 264B is located adjacent a radially outer surface 372B of the outer shaft 50. The outer shaft 50 includes a recess 370B in the radially outer surface 372B that forms a complete circumferential recess around the outer shaft 50. An insert 374B is located in the recess 370B is sized to friction fit or press fit into the recess 370B. The insert 374B can also be secured secondarily or primarily by one or more fasteners, such as a screw or a recessed set screw. The insert 374B comprises at least one of a ceramic matrix composite ("CMC"), a silicon nitride, or a silicon carbide.

A sealing surface 368B is located on the radially outer surface 372B and includes a DLC coating 380B applied to the insert 374B. The DLC coating 380B is at least partially spaced from the outer shaft 50 by the insert 374B. Therefore, the aft carbon seal 364B is spaced from and not in contact with the outer shaft 50 due at least in part to the inset 374B and the DLC coating 380B. The DLC coating 380B extends circumferentially with the insert 374B to form a complete ring of separation between the outer shaft 50 and the aft carbon seal 364B. During initial operation, a transfer film or graphitic material 392B is formed over the DLC coating 380B. The graphitic material 392B creates a carbon on carbon interface with the aft carbon seal 364B to reduce wear on the aft carbon seal 264B that can result from sliding movement between the aft carbon seal 364B and the outer shaft 50.

During operation of either the forward or aft carbon seal assemblies 60A, 60B, 160B, 260B in the gas turbine engine 20, the outer shaft 50 rotates relative to the forward and aft carbon seals 64A, 64B, 264B. Without the insert 74B, 274B, 374B and the DLC coating 80, 280B, 380B, the forward and aft carbon seals 64A, 64B, 264B would be in direct contact with the forward and aft seal seats 62A, 62B, 264B, respectively, which increases wear on carbon seals 64A, 64B, 264B. One feature of the insert 74B, 274B, 374B and the DLC coating 80, 280B, 380B is a reduction in friction between the forward and aft carbon seals 64A, 64B, 264B and their respective seal contact surface 72A, 72B, 272B, 372B.

The reduction in friction is a result of a carbon on carbon interface between the DLC coating 80, 280B, 380B and the forward and aft carbon seals 64A, 64B, 264B prior to a formation of the graphitic material 92, 292B, 392B between the DLC coating 80, 280B, 380B and the forward and aft carbon seals 64A, 64B, 264B. The graphitic material 92, 292B, 392B reduces frictional forces between the DLC coating 80, 280B, 380B and the forward and aft carbon seals 64A, 64B, 264B to reduce wear on the forward and aft carbon seals 64A, 64B, 264B. Although the illustrated example shows the graphitic material 92, 292B, 392B located between a portion of the DLC coating 80, 280B, 380B and the forward and aft carbon seals 64A, 64B, 264B, the graphitic material 92, 292B, 392B can form in a majority of the contact area between DLC coating 80, 280B, 380B and carbon seals 64A, 64B, 264B.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine comprising:
a compressor section including at least one compressor rotor, and a turbine section including at least one turbine rotor, with a shaft connecting said at least one turbine rotor to said at least one compressor rotor and there being a bearing compartment including at least one bearing for supporting said at least one shaft;
a seal assembly for sealing an axially upstream end of said bearing compartment and an axially downstream end of said bearing compartment, each of said upstream end sealed by an upstream seal having a carbon seal with a sealing surface and a seal seat having a seal surface fixed to said at least one shaft for rotation relative to the carbon seal, and a diamond-like carbon coating at least partially forming the sealing surface on the seal seat; and
wherein the diamond-like carbon coating includes a sp2 content that is greater than a sp3 content.

2. The gas turbine engine of claim 1, wherein the seal seat is comprised of at least one of a ceramic matric composite, a silicon nitride, or a silicon carbide.

3. The gas turbine engine of claim 2, wherein the diamond-like carbon coating is in direct contact with the seal seat.

* * * * *